US008874564B2

(12) United States Patent
Gupta

(10) Patent No.: US 8,874,564 B2
(45) Date of Patent: *Oct. 28, 2014

(54) SYSTEM AND METHOD FOR COMMUNICATING SEARCH RESULTS TO ONE OR MORE OTHER PARTIES

(75) Inventor: Shekhar Gupta, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 296 days.

This patent is subject to a terminal disclaimer.

(21) Appl. No.: 12/253,671

(22) Filed: Oct. 17, 2008

(65) Prior Publication Data

US 2010/0114873 A1  May 6, 2010

(51) Int. Cl.
*G06F 17/30* (2006.01)

(52) U.S. Cl.
CPC ............................... *G06F 17/30648* (2013.01)
USPC .......................................... 707/725; 707/722

(58) Field of Classification Search
CPC .................................. G06F 17/30; G06F 17/00
See application file for complete search history.

(56) References Cited

U.S. PATENT DOCUMENTS

| | | | | | |
|---|---|---|---|---|---|
| 5,249,965 | A | * | 10/1993 | Yianilos | 434/177 |
| 5,260,887 | A | * | 11/1993 | Ozaki | 708/205 |
| 5,832,452 | A | * | 11/1998 | Schneider et al. | 705/5 |
| 6,005,565 | A | * | 12/1999 | Legall et al. | 715/721 |
| 6,287,765 | B1 | * | 9/2001 | Cubicciotti | 435/6.11 |
| 6,395,889 | B1 | * | 5/2002 | Robison | 536/23.2 |
| 6,418,382 | B2 | * | 7/2002 | Rothberg et al. | 702/20 |
| 6,432,361 | B1 | * | 8/2002 | Rothberg et al. | 422/68.1 |
| 6,436,703 | B1 | * | 8/2002 | Tang et al. | 435/325 |
| 6,453,245 | B1 | * | 9/2002 | Rothberg et al. | 702/20 |
| 6,461,816 | B1 | * | 10/2002 | Wolber et al. | 435/6.12 |
| 6,477,528 | B1 | | 11/2002 | Takayama | |
| 6,944,612 | B2 | | 9/2005 | Roustant et al. | |
| 7,363,300 | B2 | * | 4/2008 | Davis et al. | 1/1 |
| 7,603,349 | B1 | * | 10/2009 | Kraft et al. | 1/1 |
| 7,707,220 | B2 | * | 4/2010 | Bonabeau et al. | 707/758 |
| 8,005,643 | B2 | * | 8/2011 | Tunkelang et al. | 702/179 |
| 8,024,327 | B2 | * | 9/2011 | Tunkelang et al. | 707/722 |
| 8,051,073 | B2 | * | 11/2011 | Tunkelang et al. | 707/722 |
| 8,051,084 | B2 | * | 11/2011 | Tunkelang et al. | 707/737 |
| 8,326,829 | B2 | | 12/2012 | Gupta | |
| 2003/0088569 | A1 | * | 5/2003 | Rubert | 707/100 |
| 2006/0106792 | A1 | | 5/2006 | Patterson | |
| 2006/0136411 | A1 | | 6/2006 | Meyerzon et al. | |
| 2006/0212447 | A1 | * | 9/2006 | Davis et al. | 707/6 |
| 2006/0242553 | A1 | | 10/2006 | Kulas | |

(Continued)

OTHER PUBLICATIONS

Google Inc., Screen Capture of Google Scholar on Feb. 8, 2007 using www.archive.org, pp. 1-10.*

(Continued)

*Primary Examiner* — Farhan Syed
(74) *Attorney, Agent, or Firm* — Swanson & Bratschun, L.L.C.

(57) ABSTRACT

A system and method for communicating search results. User input is received to perform a search of a communications network. The search is performed based on the user input to generate search results. The search results and multiple selection elements are displayed for communicating each of the search results to one or more receiving parties. A user selection of one or more of the multiple selection elements associated with one or more receiving parties is received. The search results are communicated to the one or more receiving parties in response to the user selection.

20 Claims, 8 Drawing Sheets

(56) References Cited

U.S. PATENT DOCUMENTS

| | | | |
|---|---|---|---|
| 2006/0248063 A1* | 11/2006 | Gordon | 707/3 |
| 2007/0011136 A1* | 1/2007 | Haskin et al. | 707/1 |
| 2007/0042800 A1* | 2/2007 | Tani | 455/550.1 |
| 2007/0043721 A1* | 2/2007 | Ghemawat et al. | 707/7 |
| 2007/0094232 A1 | 4/2007 | Dill et al. | |
| 2007/0094246 A1 | 4/2007 | Dill et al. | |
| 2007/0174237 A1 | 7/2007 | Wilbrink et al. | |
| 2007/0260586 A1 | 11/2007 | Savona et al. | |
| 2008/0021880 A1 | 1/2008 | Ren et al. | |
| 2008/0082512 A1* | 4/2008 | Hogan et al. | 707/3 |
| 2008/0133487 A1 | 6/2008 | Gross et al. | |
| 2008/0154825 A1* | 6/2008 | Ren | 706/45 |
| 2008/0215557 A1* | 9/2008 | Ramer et al. | 707/4 |
| 2008/0228813 A1* | 9/2008 | Weiss et al. | 707/103 |
| 2009/0006382 A1* | 1/2009 | Tunkelang et al. | 707/5 |
| 2009/0204596 A1* | 8/2009 | Brun et al. | 707/5 |
| 2010/0082450 A1* | 4/2010 | Greaves et al. | 705/26 |
| 2010/0114873 A1* | 5/2010 | Gupta | 707/722 |
| 2012/0150845 A1 | 6/2012 | Gupta | |
| 2013/0060750 A1 | 3/2013 | Gupta | |

OTHER PUBLICATIONS

Hoeber, Orland, et al "Evaluating the Effectiveness of Term Frequency Histograms for Supporting Interactive Web Search Tasks," DIS 2008, Feb. 25-28, 2008, ACM, pp. 360-368.*

Bang, Sverre, "WERA Manual" [online], from archive.org on Oct. 7, 2007, [retrieved on Jun. 16, 2011], Retrieved from the Internet <URL: http://web/archive.org/web/20071002152334/http://archive-access.sourceforge.net/projects/wera/articles/manual.html>; 11 pages.

Debnath et al., "Finding Base Time-Line of a News Article", American Association for Artificial Intelligence [online], 2005; retrieved Jan. 14, 2011 from Internet <URL: http://www.aaai.org/Papers/FLAIRS/2005/Flairs05-024.pdf>; 6 pages.

U.S. Appl. No. 12/253,643; Final Rejection dated Aug. 24, 2011; 14 pages.

U.S. Appl. No. 12/253,643; Non-Final Office Action dated Apr. 13, 2011; 12 pages.

U.S. Appl. No. 12/253,643; Notice of Allowance dated Dec. 2, 2011; 15 pages.

U.S. Appl. No. 12/253,643; Notice of Publication dated May 6, 2010; 1 pages.

U.S. Appl. No. 12/253,688; Final Rejection dated Jun. 23, 2011; 41 pages.

U.S. Appl. No. 12/253,688; Non-Final Office Action dated Feb. 1, 2011; 19 pages.

U.S. Appl. No. 12/253,688; Notice of Publication dated May 6, 2010; 1 page.

U.S. Appl. No. 12/253,643; Issue Notification dated Mar. 21, 2012; 1page.

U.S. Appl. No. 13/399,839; Non-Final Office Action dated Apr. 26, 2012; 25 pages.

U.S. Appl. No. 12/253,688; Issue Notification dated Nov. 14, 2012; 1 page.

U.S. Appl. No. 12/253,688; Notice of Allowance dated Aug. 2, 2012; 37 pages.

U.S. Appl. No. 13/399,839; Final Rejection dated Oct. 15, 2012; 23 pages.

U.S. Appl. No. 13/399,839; Examiner's Answer dated Nov. 23, 2013; 8 pages.

U.S. Appl. No. 13/667,475; Non-Final Rejection dated Oct. 23, 2013; 46 pages.

U.S. Appl. No. 13/667,475; Final Rejection dated Feb. 26, 2014; 34 pages.

U.S. Appl. No. 13/667,475; Non-Final Rejection dated Jun. 23, 2014; 39 pages.

* cited by examiner

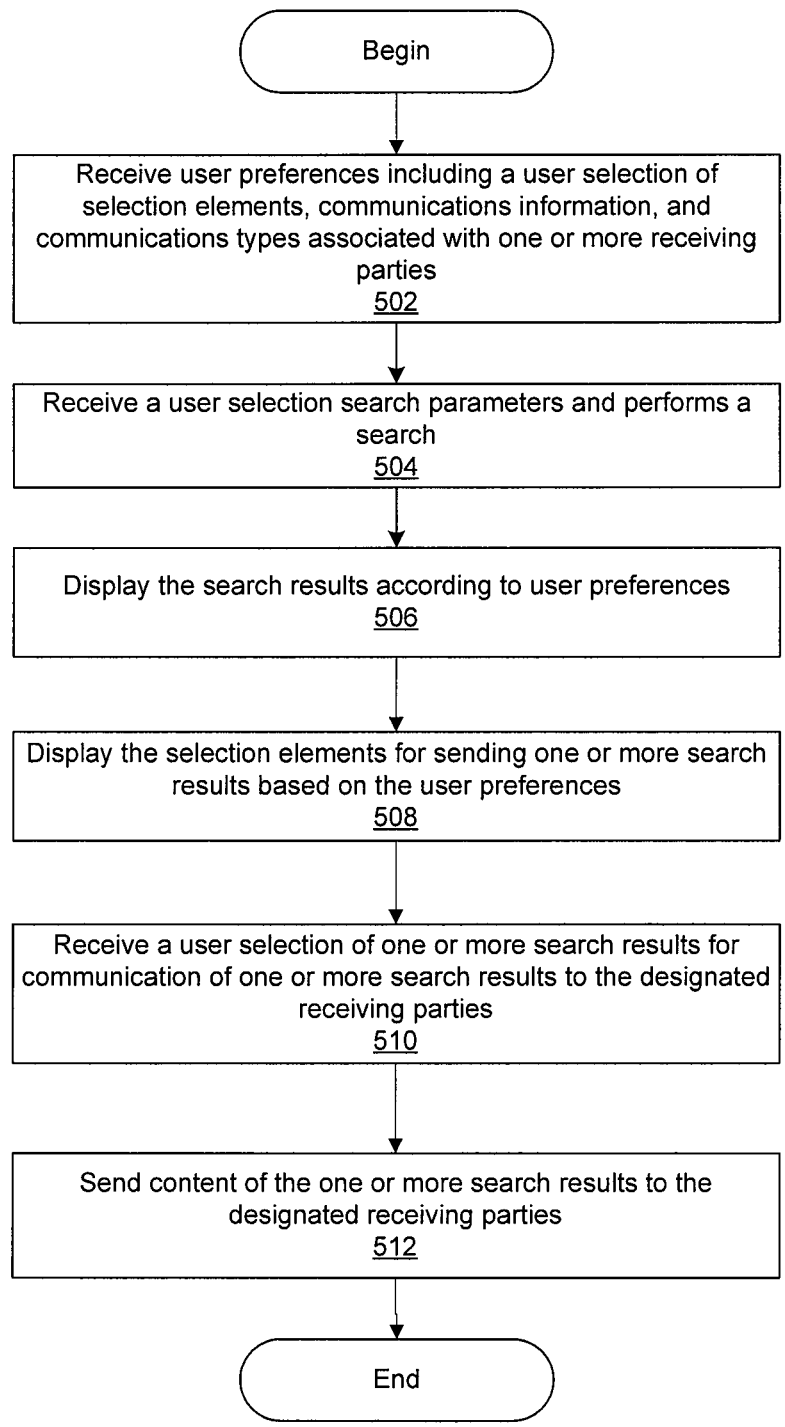

FIG. 6

| Graphical User Interface | 600 |

Enter search here 602 | Wheels

Sort results by 604 | Date - most recent ▼

Advanced search options 606

Pages published from 01/02/2008 to 01/25/2008
Exclude results posted previous to 01/02/2008

Results 1-5 of about 48,000
Date of Publication or Last Updated XXX

Wheels - free encyclopedia entries
Used in a variety of ways, wheels...
www.webencylopedia.com Last Updated 8/12/08
View site history ▼

Wheels.com Find your new set of wheels
Car, truck and motorcycle tires for the
lowest prices anywhere.
www.wheels.com Last Updated 8/2/08
View site history ▼

Invention of the wheel
The use of the wheel dates back to the...
www.history.com Publication Date 7/27/08
View site history ▼

Wheels for sale
Your discount source for quality wheels
for a variety of vehicles and price ranges.
www.wheelie.com Last Updated 7/07/08
View site history ▼

All wheels
www.allwheels.com

608

Last Updated 6/9/08
View site history ▼
Created 3/12/08
Posted 3/14/08
Updated 4/1/08
Revisions 4/7/08
Updated 5/2/08
Updated 6/9/08

*FIG. 7*

| Graphical User Interface | 700 |
|---|---|

| Enter search here 702 | Wheels |
|---|---|

| Advanced search options 704 ||
|---|---|
| Exclude results from movietube.com | Select other websites to exclude ▼ |
| Preference given to scholarly journals | Exclude all adult content |
| Exclude results based on proximity | Greater that 100 miles |

706                                                              Results 1-5 of about 48,000

Wheels - free encyclopedia entries           Remove result? ☑
Used in a variety of ways, wheels...          Remove all results from this website? ☐
www.webencylopedia.com                        Remove related results? ☑

Wheels.com Find your new set of wheels       Remove result? ☐
Car, truck and motorcycle tires               Remove all results from this website? ☐
for the lowest prices anywhere.               Remove related results? ☐
www.wheels.com Invention of the wheel                        Remove result? ☐
The use of the wheel dates back to the...    Remove all results from this website? ☐
www.history.com                               Remove related results? ☐

Wheels for sale                               Remove result? ☐
Your discount source for quality wheels      Remove all results from this website? ☑
for a variety of vehicles and price ranges.  Remove related results? ☑
www.wheelie.com All wheels                                    Remove result? ☐
www.allwheels.com                             Remove all results from this website? ☐
                                              Remove related results? ☐

708        Excluded Content Summary
Adult content
Results from movietube.com and related results
Exclude content outside of 100 mile radius            Previously excluded:
Display scholarly journals first                      Results from searching.com

FIG. 8

| Browser | 800 |

Username | Llester | Select location to save results ▼
Password | ******** | Current Location - Temporary folder
802

Enter search here | Wheels
804

Sending options
806

Current click to send options | Add click to send option
- [A] Home computer
- [B] Boss's computer
- [J] Jill's mobile
- [F] Folder Connect to contact list | Voice activated sending options active? | Y Results 1-5 of about 48,000

Wheels - free encyclopedia entries
Used in a variety of ways, wheels...
www.webencylopedia.com Send to [A][B][J][F]
Select from contact list Wheels.com Find your new set of wheels
Car, truck and motorcycle tires
for the lowest prices anywhere.
www.wheels.com Send to [A][B][J][F]
Select from contact list

808

Invention of the wheel
The use of the wheel dates back to the...

Send to [A][B][J][F]
Select from contact list

Wheels for sale
Your discount source for quality wheels
for a variety of vehicles and price ranges.
www.wheelie.com Send to [A][B][J][F]
Select from contact list All wheels
www.allwheels.com Send to [A][B][J][F]
Select from contact list

SYSTEM AND METHOD FOR COMMUNICATING SEARCH RESULTS TO ONE OR MORE OTHER PARTIES

BACKGROUND OF THE INVENTION

The use of and development of network searching has grown nearly exponentially in recent years. The growth is fueled by larger networks, more reliable protocols, and better communications and computing hardware available to service providers and consumers. Despite the many improvements, finding relevant publication dates, communicating search results, and removing irrelevant search results may still be difficult.

BRIEF SUMMARY OF THE INVENTION

One embodiment provides a system and method for communicating search results. User input may be received to perform a search of a communications network. The search may be performed based on the user input to generate search results. The search results and multiple selection elements may be displayed for communicating each of the search results to one or more receiving parties. A user selection of one or more of the multiple selection elements associated with one or more receiving parties may be received. The search results may be communicated to the one or more receiving parties in response to the user selection.

Another embodiment provides a server for communicating search results. The server may include a browser operable to receive user input for a search of the Internet. The browser may perform the search to return search results. The search results may be displayed to a user as well as multiple selection elements for communicating each of the search results to one or more receiving parties. The server may also include user preferences in communication with the browser. The user preferences may be operable to receive user selections associating each of the multiple selection elements with one or more receiving parties and store communications information for each of the one or more receiving parties. The browser may be operable to communicate the search results to the one or more receiving parties in response to a user selection of one or more of the multiple selection elements.

Yet another embodiment provides a server for communicating search results. The server may include a processor for executing a set of instructions and a memory in communication with the process for storing the set of instructions. The set of instructions may be executed by the processor to receive user input to perform a search of a communications network, perform the search based on the user input to generate the search results, display the search results and multiple selection elements for communicating each of the search results to one or more receiving parties, receive a user selection of one or more of the multiple selection elements associated with the one or more receiving parties, and communicate one or more of the search results to the one or more receiving parties based on the user selection.

BRIEF DESCRIPTION OF THE DRAWINGS

Illustrative embodiments of the present invention are described in detail below with reference to the attached drawing figures, which are incorporated by reference herein and wherein:

FIG. 5 is a flowchart of a process for communicating search results in accordance with an illustrative embodiment;

FIG. 6 is a pictorial representation of a graphical user interface displaying publication information for search results in accordance with an illustrative embodiment;

FIG. 7 is a pictorial representation of a graphical user interface for collapsing search results in accordance with an illustrative embodiment; and FIG. 8 is a pictorial representation of a browser for communicating search results in accordance with an illustrative embodiment.

DETAILED DESCRIPTION OF THE INVENTION

Figure 1:
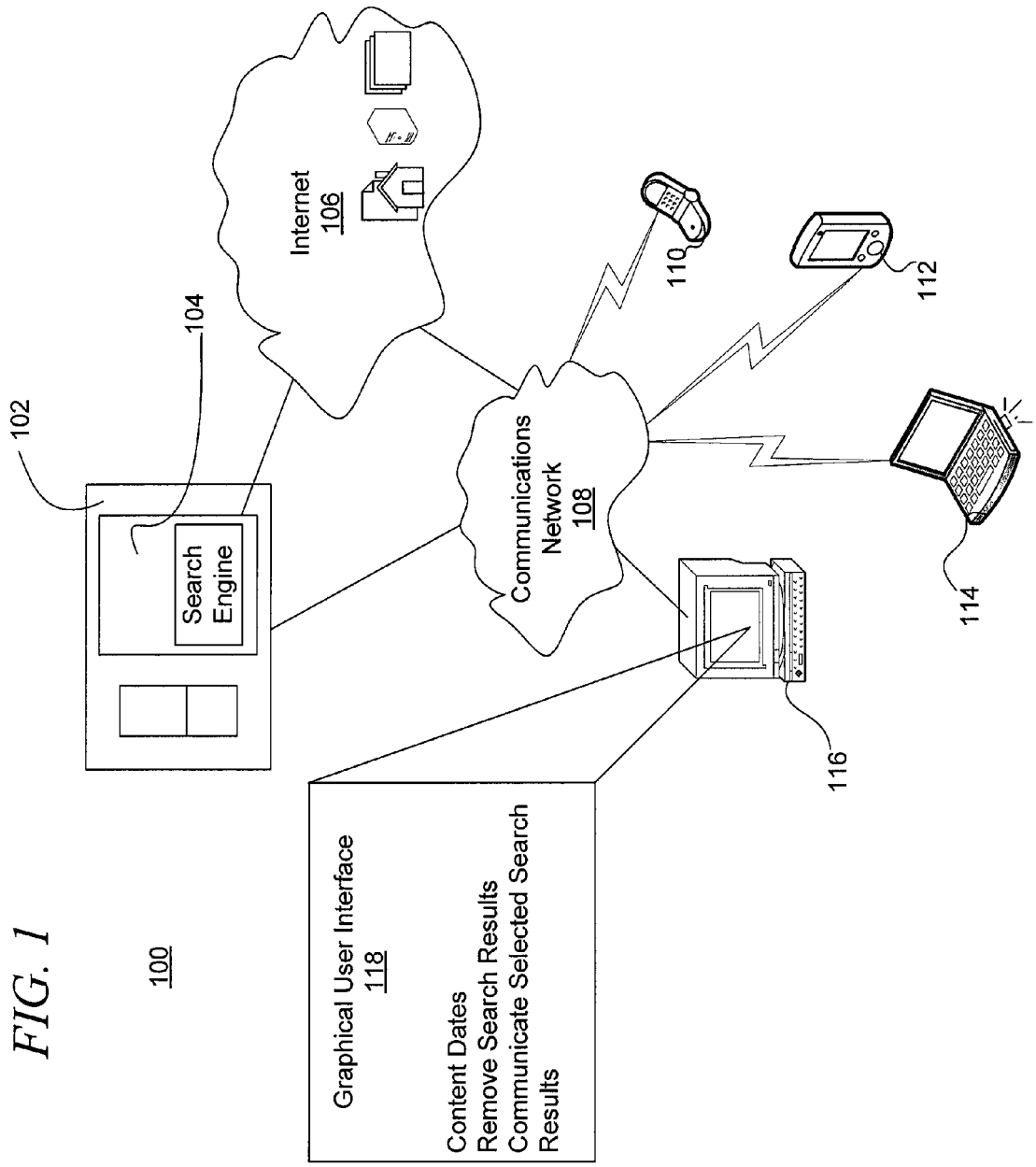
FIG. 1 is a pictorial representation of a communications environment in accordance with an illustrative embodiment.

FIG. 1 is a pictorial representation of a communications environment 100 in accordance with an illustrative embodiment. The communications environment 100 is an environment location or setting in which communications, and particularly, network and Internet searches may be performed. In one embodiment, the communications environment 100 may include a communications management system 102, a server 104, the Internet 106, a communications network 108, wireless devices 110 and 112, a laptop 114, a computer 116, and a graphical user interface 118. The communications environment 100 may also include any number of either equipment devices, software modules, communications lines, or other computing communications elements.

Communications within the communications environment 100 may occur on any number of networks which may include wireless networks, data or packet networks, cable networks, satellite networks, private networks, publicly switched telephone networks (PSTN), or other types of communication networks. The communications network 108 is infrastructures for sending and receiving messages and signals according to one or more designated formats, standards, and protocols. The networks of the communications environment 100 may represent a single communication service provider or multiple communications services providers. The features, services, and processes of the illustrative embodiments may be implemented by one or more elements of the communications environment 100 independently or as a networked implementation.

A wired or wireless network may include any number of systems, towers, servers, and other network and communications devices for implementing the features and performing the methods herein described. The wireless devices 110 and 112 may communicate with a transmission tower using communications protocols, such as time division multiple access (TDMA), code division multiple access (CDMA), global systems for mobile (GSM) communications, personal communications systems (PCS), WLAN, WIMAX, or other frequently used cellular and data communications protocols and standards. The wireless devices 110 and 112 may include cellular phones, Blackberry® devices, personal digital assistances (PDA), mp3 players, laptops, evolution data optimized (EDO) cards, multi-mode devices, and other wireless communication devices and elements. Wired networks may include hardwired connections, such as fiber optics, T1, cable, DSL, Ethernet, high-speed trunks, and telephone lines.

The communications management system 102 is the devices and software that implement Internet or network searches and the corresponding features, as herein described. In one embodiment, the communications management system 102 may be a server farm utilized by any number of users to generate or return search results based on searches or queries from individual users. The server 104 is a computing device that includes logic for extracting content dates for search results, collapsing or limiting search results, and communicating one or more search results to one or more receiving parties. In one embodiment, the server may include hardwired or software logic for a search engine configured to perform the various features herein described. The user input that is utilized by the server 104 to generate the search results may be received through the Internet 106 or the communications network 108. For example, the user input requesting search results may be originally communicated or requested through devices or software operating on the wireless devices 110 and 112, laptop 114, and computer 116, in one example.

The communications management system 102 may also be utilized to enable, initiate, route, and manage communications between one, or more telephonic and data devices. The communications management system 102 may include one, or more devices networked to manage the communications network 108. For example, the communications management system may include any number of servers, routers, switches, or advanced intelligent devices. The communications network 108 sends and receives the electronic signals through any number of transmission mediums. The communications network 108 may include various fiber optics, cables, transmission towers, antennas, or other elements for communicating voice communications to the connected telephonic devices.

The computer 116 may be a personal computer for performing and executing programs and instructions and accessing the Internet 106 and communications network 108. However, the computer 116 may be any computing device suitable for communicating with a network connection. In one embodiment, the computer 116 may include or access a wireless router, adapter, switch, hub, or other device to communicate with the communications network 108 and/or Internet 106.

In one embodiment, the computer 116 may display or utilize the graphical user interface 118 to display information, data, content, and search results to the user, as well as receive user input, selections, and other feedback. In one embodiment, the graphical user interface 118 may be a browser, application, or interface to the search engine operated by the communications management system 102.

The graphical user interface 118 may be similarly displayed or utilized by the wireless devices 110 and 112, laptop 114, or other devices in communication with the communications network 108 or the Internet 106. In particular, the graphical user interface 118 may display selection elements, icons, indicators, hyperlinks, check boxes, dropdown menus, or other interface elements for receiving user input or selection. The one or more selection elements are interface elements for receiving a user selection. The selection elements may be user selected, created, or entered pictures, graphics, images, text, or other display information that may be clicked, activated, or otherwise selected. In one embodiment, the selection elements may be utilized to limit or prioritize search results based on a content date associated with each of the search results. In another embodiment, the selection elements may allow a user to select irrelevant or incorrect search results to be removed from the displayed search results. In yet another embodiment, the user may select or activate one of the selection elements to automatically email, text message, or otherwise transmit a message, including one or more search results and/or the corresponding content of the search results to one or more parties associated with the selected selection elements. For example, the user may utilize user preferences available through the graphical user interface 118 and stored by the server 104 to link or associate each of the selection elements with one or more receiving parties. The receiving parties may include users, devices, applications, or other communications elements suitable for receiving communications.

Figure 2:
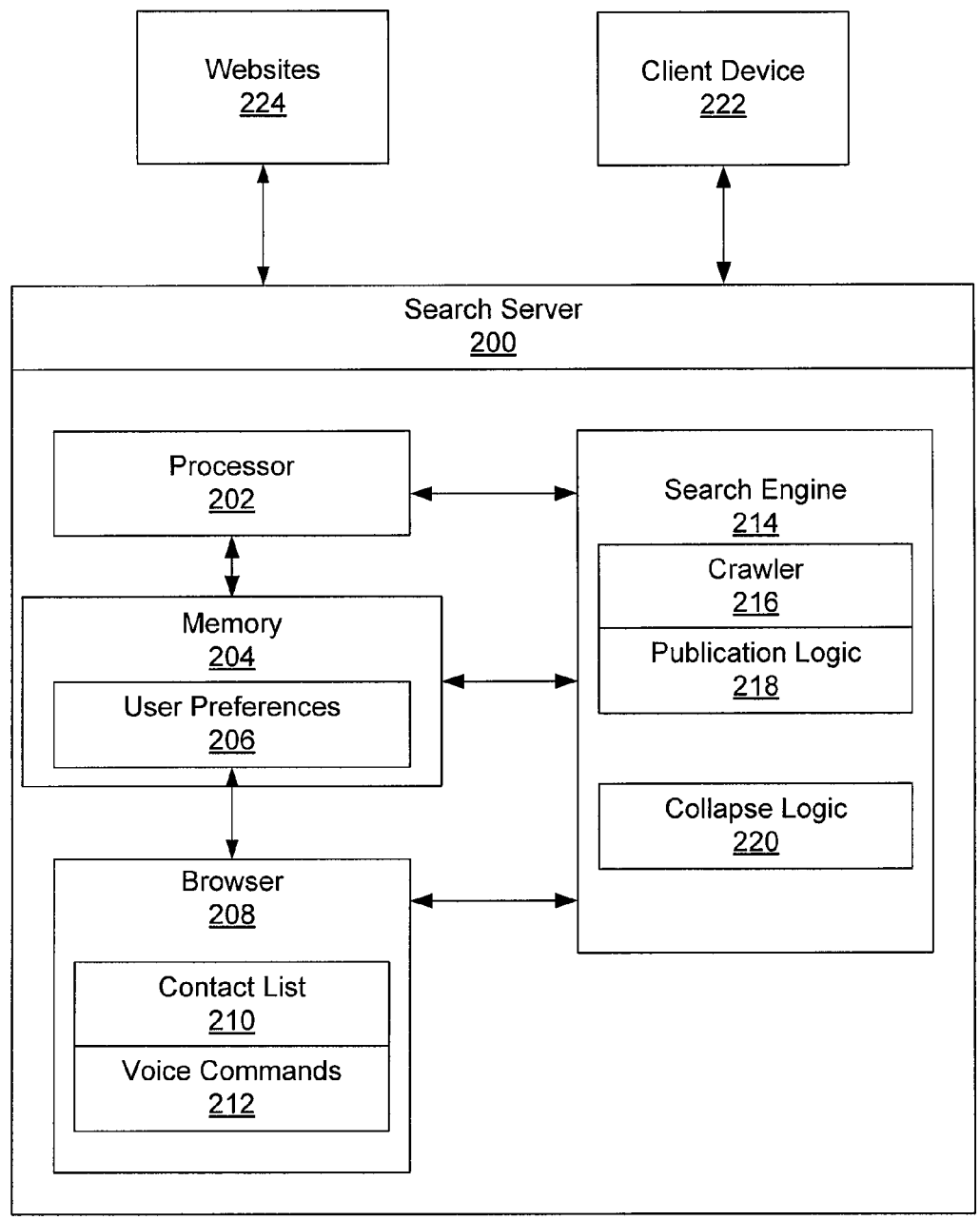
FIG. 2 is a block diagram of a search server in accordance with an illustrative embodiment.

FIG. 2 is a block diagram of a search server 200 in accordance with an illustrative embodiment. The search server 200 is a particular implementation of the server 104 of FIG. 1. The search server 200 may include any number of elements, cards, busses, circuits, software applications and modules, or other similar communications and computing elements. In one embodiment, the search server 200 may include a processor 202, a memory 204, user preferences 206, a browser 208, a contact list 210, voice commands 212, a search engine 214, a crawler 216, publication logic 218, and collapse logic 220. The search server 200 may further communicate with a client device 222, and website 224.

The processor 202 is circuitry or logic enabled to control execution of a set of instructions. The processor 202 may be a microprocessor, digital signal processor, central processing unit, or other device suitable for controlling an electronic device including one or more hardware and software elements, executing software, instructions, programs, and applications, converting and processing signals and information, and performing other related tasks. The processor 202 may be a single chip or integrated with other computing or communications elements.

The memory 204 is a hardware element, device, or recording media configured to store data for subsequent retrieval or access at a later time. The memory 204 may be static or dynamic memory. The memory 204 may include a hard disk, random access memory, cache, removable media drive, mass storage, or configuration suitable as storage for data, instructions, and information. In one embodiment, the memory 204 and processor 202 may be integrated. The memory may use any type of volatile or non-volatile storage techniques and mediums.

In one embodiment, the search server may store instructions or an application within the memory 204. The instructions 204 may be executed by the processor 202 to display content, a date, search results, collapsed search results based on user input, and communicate one or more search results to one or more receiving parties based on a selection of one or more interactive elements.

The user preferences 206 are the settings, configurations, and parameters for one or more users or devices. The user preferences 206 may store user input, logic, or learned preferences received from the browser 208, search engine 214, publication logic 218, or collapse logic 220. The user preferences 206 may be configured to learn preferences of one or more users based on previous selections and configuration, and active selections of user interface options and configurations.

The browser 208 is a network interface application. In one embodiment, the browser 208 may be integrated with the search engine 214. As a result, various selection elements and indicators may be automatically displayed to the user utilizing a browser application remotely. In another embodiment, any time the user selects or navigates to a specific webpage or the search engine 214 available through the search server 200, the additional features and selection elements, herein described, may be available. As a result, the various selection elements and features may be available remotely through a locally executed or accessed program, graphical user interface, browser or webpage. The browser and search engine may also be available from the search server 200 utilizing any access systems or methods suitable to occur through a wired or wireless communications network.

The contact list 210 is a listing or compilation of the contacts for one or more users. In one embodiment, the contact list 210 may be a network address list, global contact list, or directory. The contact list 210 may store phone numbers, email addresses, user names, nicknames, or other communications information. In one embodiment, the user may associate one or more selection elements with one or more receiving parties. The selection elements may be automatically displayed next to search results or in a designated location within the browser 208.

In one embodiment, the contact list 210 and the selection element utilized by the user preferences 206 may be accessed by one or more parties. For example, the user may have associated one or more pictures of family members with contact information and methods, including sending text messages to cell phones, emails to PDA or Blackberry devices, or instant messages to one or more of the receiving parties. If the receiving party updates the contact information or contact methods, the information may be automatically transmitted or communicated to the user preferences 206 to update the selection element. For example, if the receiving party changes a phone number available to the browser 208 through one of the websites 224, the selection element may be updated so that the correct cell phone is text messaged, as selected by the user.

In one embodiment, the selection elements may include a miniature picture of a user or device. For example, the user may associate a picture of the user's spouse with a text message number and an instant messaging program user name. As a result, by selecting the miniature picture of the user's spouse, an associated search result may be text messaged to the spouse's cell phone and an instant message may be sent through the applicable messaging service. In another embodiment, the user may associate an icon of a building with the user's workplace. By clicking and dragging a search result to the icon of the building, the user may automatically email a number of co-workers the selected search results.

The browser 208 may represent both a browser application stored in the search server 200 and one or more remote browsers that may be accessed by users to navigate one or more communications networks, which may include the Internet. The user preferences 206 may be configured to automatically email a hyperlink of one or more search results, the content of the search results, or both a link and the content of the search results. In another embodiment, the user preferences 206 may be configured to change a summary of the content of the search result to the one or more receiving parties. In another embodiment, by selecting a selection element, the browser 208 may automatically call one or more phone numbers. The browser 208 may then use text-to-voice technology in order to read the content of the selected search results to the user. As a result, the browser 208 may utilize an interactive voice response system in order to allow a receiving party to end the transmission or otherwise select to receive the search result and associated content through a communication of the receiving party's selection. For example, the receiving party may not have time to listen to all of the content, and as a result, may request that the content be sent to a specified email, text message, chat, blog, or other communication service. In another embodiment, the user may utilize the voice commands 212 to initiate or implement communications to one or more receiving parties. The voice commands 212 are sounds, words, or phrases that are linked with a particular action. In one embodiment, the voice commands 212 may be similarly associated with one or more receiving parties.

The user may enter the voice commands 212 or voice recognition logic may be utilized to convert or translate the voice commands to an action implemented through the browser 208. For example, by specifying "email dad" a search result of sports scores may be automatically emailed to the user's dad. The voice commands 212 may include any number of default commands, such as "call", "email", "text message", or "instant message" that may be automatically linked or associated with the persons, devices, or other parties, included in the contact list 210 based on the speech of the user. An illustrative embodiment may allow a user with a single click or selection to communicate search results to one or more receiving parties utilizing any number of communications methods, schemes, standards, or protocol.

The search engine 214 is a searching tool that generates search results based on user input or selections. The search engine 214 may be implemented as an application, hardware, or a combination thereof. The search engine 214 may be accessed by one or more users through a web browser, application, or website affiliated or linked with the search engine 214. The crawler 216 is an application configured to search through and analyze content available through one or more search results. In one embodiment, the crawler 216 may be configured to search through the content of the search results to determine content dates.

The content dates are publication dates or post dates associated with the content or the search results. For example, if a paper or document was originally published or finished on Apr. 30, 2012, that information, as well as the first time the published content was posted to the relevant communications network, may be listed. The crawler 216 may retrieve any of the relevant publication and post dates. In one embodiment, the crawler 216 may compile a list of the various publications and post dates. For example, if the original drawings were generated on May 15, 2009, but the drawing was not published through the Internet until Oct. 21, 2010, the crawler 216 may retrieve those dates. Similarly, the crawler 216 may ascertain that drawings were modified on Dec. 15, 2010, and subsequently re-posted on Jan. 18, 2011.

In one embodiment, the crawler 216 may archive or copy the search results or associated content in order to be able to display any number of publication and post dates. In one embodiment, the crawler 216 may use a large scale memory architecture to automatically archive all or portions of content available through multiple communications networks. Different versions, changes, updates, and reconfigurations may be recorded or noted for subsequent retrieval. As a result, the content date may be more reliably used by any number of parties. For example, in some Internet searches, such as prior art searches for patent drafting, the content dates are very important and may establish inventorship or when an idea, concept, or invention first became public knowledge or otherwise available.

In one embodiment, the crawler 216 may search for keywords, such as published, drafted, submitted, or in other words that may be indicative of the associated content being first generated. These keywords may be utilized to retrieve the publication date. Similarly, information or data available through the website indicating a first or subsequent post date may be retrieved by the crawler 216. For example, the content associated with the search results may be a directory of care providers for an insurance group. As a result, each time the published information is changed, updated, and re-posted, the content dates may be revised to further include that information and the associated history with those changes.

In one embodiment, only the most recent content dates may be displayed to a user through the search engine 214. The user may select to limit, expand, or review search results based on the shown dates and results. Correspondingly, the user may further select to expand or review the entire content date history for review or analysis. The publication logic 218 is the logic for managing the display of search results based on the content date. In one embodiment, the user may select to limit search results to two years, including 2007 and 2008. In another embodiment, the user may select to view the search results based on the first reported post date. The user may also select to view all search results published in May and June, 1999.

The publication logic 218 may allow a user to specify any number of criteria relating to the content date for expanding, limiting, or focusing the search result. In one embodiment, the content date, including the most recent publication and post date, may be displayed in columns along side the search results. The columns may allow a user to quickly associate the relevant dates with the search content. Search results with inconclusive publication or post dates may be marked by the crawler 216 or publication logic 218 for display to the user. In one embodiment, the publication logic 218 or the crawler 216 may utilize source code, embedded information, or other data to register, as well as extract the content date. In another embodiment, a designation or specialized code may be utilized by the search engine 214 or the browser 208 to register the applicable content date. As a result, the publication and post date may be more easily extracted and viewed by the user.

The collapse logic 220 is logic for collapsing, removing, and limiting search results displayed to a user. The collapse logic 220 may utilize any number of algorithms, systems, statements, and methods to remove search results based on user input or selection. In one embodiment, the user may activate a selection element to remove a particular search result. Each search result may be individually removed or may be removed utilizing intelligence within the collapse logic 220 to remove the search result, as well as other similar search results that are similarly irrelevant or inapplicable.

The collapse logic 220 may utilize any number of methods to remove irrelevant search results based on a single or multiple user selections. In one embodiment, when a user selects to remove a search result, a pop-up window, or user interface may provide logic statements or options that specify why the user is selecting the search results as irrelevant or otherwise selecting it for removal. Logic statements are mathematical, text, or boolean statements that are determined from the search result and associated content. For example, the pop-up window may include one or more logic statements written or presented as assertions or assumptions that the user may verify. The user input may be utilized for a single search or may be stored within the user preferences 206 so that subsequent searches do not include materials that the user will generally find irrelevant, offensive, or otherwise, inapplicable to the user's needs. For example, after performing an Internet search for "wheels", the user may select to remove all videos and pictures displayed in the search results that originate from the domain name "movietube.com". Similarly, if the search results are linked with a particular zip code or address, the user may select to limit the search results to a proximity of 100 miles of the user or of a selected zip code or area.

In one embodiment, once the user selects a search result for removal, the collapse logic 220 may perform additional analysis of the selected search results and associated content. For example, utilizing a keyword search, the collapse logic 220 may determine that the search term of the keyword "red doors" is irrelevant to musical groups with the name "doors" or "red" within it. As a result, all of the search results that include references to musical groups may be removed from the overall list of search results. In another embodiment, the determination of logic statements, keywords, and phrases that indicate the search result is to be removed are determined by the collapse logic 220. For example, a sequence of words that are within twenty words or 160 characters of each other may be used to remove search results. The user may be prompted to select specific logic statements, terms or keywords from the content that further indicates the search is irrelevant in order to more effectively limit, narrow, or collapse the search results. In one embodiment, a pop-up window may be displayed to the user requesting that the user affirm or reject logic statements utilized to remove similarly irrelevant search results. For example, if the logic statement is incorrect resulting in the collapse logic 220 improperly removing potentially relevant search results, the user may select to reject the logic statement. At any time the user may add or delete logic statements utilized by the collapse logic 220.

The collapse logic 220 may use metatags, tides, keywords, phrases, categorizations, headlines, domain names, affiliates, or other content, data, or information that may be gleaned from the applicable search results or content for removing other links that the user may wish to or may seek to collapse or remove. For example, while performing a search for the "Great Lakes", the user may select to remove information about the state of Michigan. As a result, the collapse logic 220 may similarly remove search results, content, or even advertisements that are directed toward the state of Ohio. Additional search limitations logic understood by those skilled in the art may similarly be applied without specifically calling out each particular example.

In another example, the user may select to research a particular political candidate. The user may select to remove one or more references that include content seeking to discredit the candidate otherwise negatively referred to the political candidate. As a result, the collapse logic 220 may utilize keywords, including insults, derogatory language, or other information to dynamically remove other links that the collapse logic 220 has determined, may be irrelevant to the user.

In one embodiment, the removed or suspect links may be color coded or included later in the search results. For example, links that are assumed to be irrelevant may be colored in yellow, whereas relevant links may be colored in red. In another embodiment, all search results that are determined to be irrelevant may be included on the final pages of the search result to minimize the time the user may spend in analyzing these documents that are most likely irrelevant based on the user's prior input. An illustrative embodiment may dynamically remove search results based on determined associations or may request further clarifications from the user in order to remove additional search results that the user may find similarly inapplicable to the performed search.

As previously described, the collapse logic 220 may store past logic statements, behaviors, and selections in the user preferences 206 so that future search results are prioritized based on the previous behavior of the user. The collapse logic 220 may also display historical selections and choices for perpetual or selective use during searches. As a result, the search engine 214 may more carefully tailor the search results for each user. Additionally, based on permissions or various procedures, the user preferences 206 may be shared with one or more service providers in order to better prioritize search results for any number of users. As described, the browser 208, search engine 214, and user preferences 206 may send and receive information from the client device 222 and the websites 224.

Figure 3:
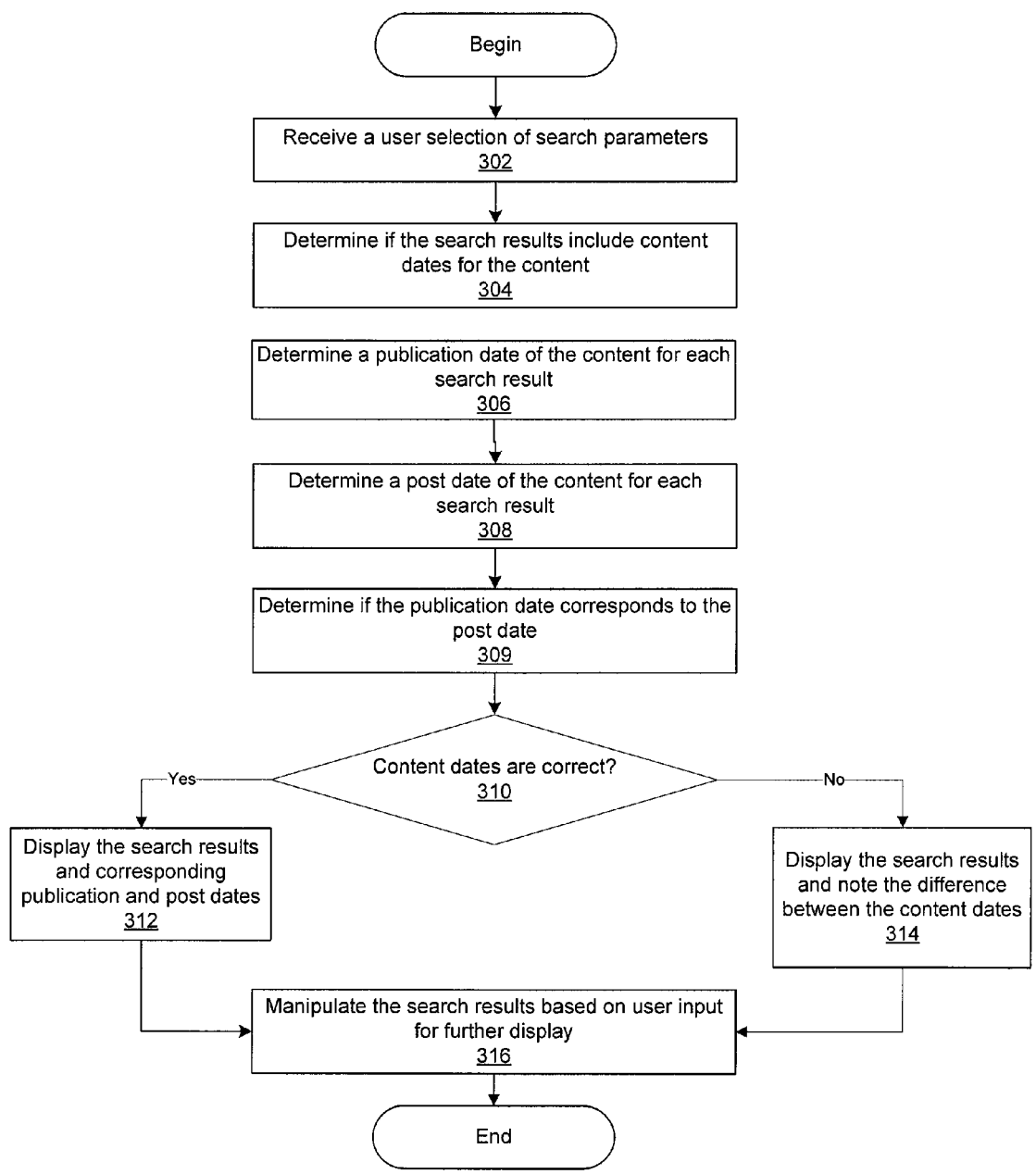
FIG. 3 is a flowchart of a process for displaying publication information for search results in accordance with an illustrative embodiment.

FIG. 3 is a flowchart of a process for displaying publication information for search results in accordance with an illustrative embodiment. The process of FIGS. 3, 4, and 5 may be implemented by a server. The server may provide a browser, search engine, or other application that is stored locally or available to a user through a network connection. The process may begin with the server receiving a user selection of search parameters (step 302). The search parameters may be keywords, characters, numbers, data, or other information that may characterize the search the user would like to perform. Next, the server determines if the search results include content dates for the content (step 304). It is assumed that the server has performed a search of one or more communications networks which may include the Internet. As previously described, the content dates may include publications and post dates for the content of each of the search results. The content dates may include any number of revisions, updates, modifications, or other history that may be part of the content dates.

Next, the server determines the publication date of the content for each search result (step 306). The server determines a post date of the content for each search result (step 308). Steps 306 and 308 may be performed sequentially or simultaneously. In one embodiment, a crawler or an authentication program may be utilized to extract the publication date or the post date from the applicable website application, host, server, domain, archive, website, or other relevant source.

In one embodiment, the user preferences may specify whether the server is to display the publication date, the post date, or both publication and post dates, or none of the applicable dates. The user preferences may allow the user to limit information that may be irrelevant to the user. Publication or post dates may be determined by comparing content available through network addresses at different times.

Next, the server determines whether the content dates are correct (step 310). The determination of step 310 may be made based on information determined by the server. For example, if a publication date and a post date are only days apart, the server may determine that the content dates are correct. In another example, if the publication date is years before the post date, the search result or the content may be marked as suspect, questionable, or having another status associated with the difference or deviations between the dates.

If the content dates are correct, the server displays the search results and corresponding publication and post dates (step 312). The search results may be more valuable to the user because content dates may provide context, history, and chronological background as to when the article, document, picture, drawing, post, file, comment, or other information was originally generated, posted, updated, or modified to a communications network.

If the server determines the content dates are not correct in step 310, the server displays the search results and notes the difference between the content dates. The differences or discrepancies of the content dates of step 314 may be particularly valuable to researchers, students, or other users. The differences and discrepancies in the content dates may further allow the user to determine the reliability or content with each of the search results. The differences may be specifically called out using text or an associated image, symbol, icon, or other indicator.

Next, the server may manipulate the search results based on user input for further display (step 316). The user input of step 316 may include inserting relevant or irrelevant date ranges or other criteria. For example, the user may specify that information or search results published before 2006 are irrelevant. In another example, the user may specify that all search results posted in the month of December are inapplicable. The search results may be manipulated based on any number of times, dates, calendar information, or data.

Figure 4:
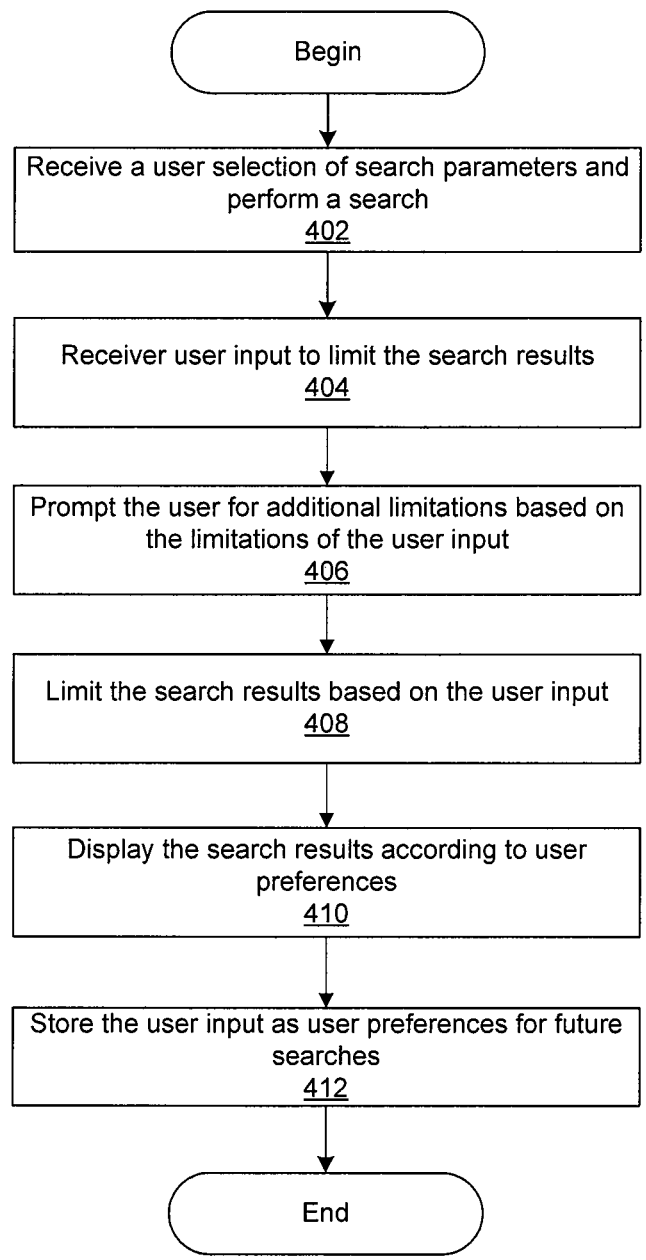
FIG. 4 is a flowchart of a process for collapsing search results in accordance with an illustrative embodiment.

FIG. 4 is a flowchart of a process for collapsing search results in accordance with an illustrative embodiment. The process of FIG. 4 may begin by receiving a user selection of search parameters and performing a search (step 402). Next, the server receives user input to limit the search results (step 404). The user input of step 404 may be a selection of an indicator, check box, icon, or other selection element associated with one of a number of search results. For example, by selecting a check box next to a search result which includes adult content, the search result may be removed from remaining search results. In another embodiment, the user may utilize an indicator for collapsing the selected search result so that more relevant search results are visible for review.

Next, the server may prompt the user for additional limitations based on the limitations of the user input (step 406). In one embodiment, the server may automatically extract any number of terms or reasons why the search result may have been selected for removal in step 304. The user may be prompted to select keywords, domain names, proximity elements, source characteristics, or other information that may make the selected search result irrelevant, inapplicable, or unusable by the user. In another embodiment, the user may not be prompted for additional limitations. Instead the server may automatically make assumptions based on the user input. For example, if the user has performed a search for the "Rocky Mountains" in step 402 and has selected to remove one or more references that relate to liquor, all such references may be selected by the server for potential removal or limitations.

Next, the server limits the search results based on the user input (step 408). The search results may be limited in step 408 based on user input and additional limitations of steps 404 and 406. During step 408, the overall search results may be collapsed or limited to remove the specified search results, as well as other search results that may be determined to be irrelevant or substantially similar to the removed search results. In another embodiment, the search results determined to be irrelevant or potentially irrelevant based on the user input may be color coded, specifically marked, or prioritized as less important.

In one embodiment, an indicator, or selection element, such as "+", may illustrate to the user that a search result has been removed. The indicator may be selected to redisplay the collapsed search results. Next, the server displays the search results according to user preferences (step 410). For example, the user preferences may specify that collapsed logic may be implemented to automatically remove other search results that are similar to the search results selected for removal by the user. The user preferences of step 410 may also specify that search results selected for removal are placed at the end or near the end of the listed search results.

Next, the server stores the user input as user preferences for future searches (step 412). The user input received in steps 404 and 406 may be stored as rules, parameters, or factors that the logic of the server may be utilized when performing additional searches for the user in the future. For example, if the user input selects to remove all adult content from the search results and the user has previously selected to remove all adult content during a prior search, the server may generate a high level rule that prevents adult material from being displayed in the user's search results. In one embodiment, the user preferences may be prioritized based on the statistical likelihood that the user will remove one or more search results based on a factor, logic statement, parameter, keyword, data, or other information. As a result, the user preferences are dynamically learned by the server for mote accurately performing search results in the future. By removing one or two search results from each search performed, the search engine and the corresponding user preferences may be more correctly adjusted for the types of information utilized by the user and the sources of information that are considered most valuable.

FIG. 5 is a flowchart of a process for communicating search results in accordance with an illustrative embodiment. The process of FIG. 5 may begin by receiving user preferences, including a user selection of selection elements, communications information, and communications types associated with one or more receiving parties (step 502). The user preferences may specify how one or more receiving parties are contacted or how messages or other contents are sent or streamed to the receiving parties. The user may associate any number of selection elements with one or more receiving parties. For example, an icon showing the home may be linked with a home computer that is communicated with through an email, a picture of the user's spouse may be associated with a text message to a cell phone of the user's spouse, and a blog, the letter "d" may be associated with an instant messaging program for sending an instant message of the search results to the user's dad. As a result, any number of selection elements may be associated with one or more receiving parties. For example, a single selection element may be linked with an entire group, such as a football team, for immediately sending a search result to each member of the team.

Next, the server receives a user's selection of each parameter and performs a search (step 504). The search of step 504 may be a standard Internet or communications network search. The server displays the search results according to the preferences (step 506). In one embodiment, the server may utilize a web browser, search engine, application, or other communications interface to display the search results to the user. The user preferences may include the configurations made during step 502.

Next, the server displays the selection elements for sending one or more search results based on user preferences (step 508). In one embodiment, any number of selection elements may be displayed at the top of the graphical user interface or next to each search result, and by selecting one or more of the selection elements, a message, or communication of the corresponding search result and/or content of the search result, may be sent to one or more receiving parties.

Next, the server receives a user selection of one or more selection elements for communication with the designated receiving parties (step 510). By selecting or activating the selection elements, the communication may be automatically initiated. As a result, the user is not required to enter contact information and specify a type of communication to be utilized. In one embodiment, the search results may not be sent until a user has selected each of the applicable selection elements. As a result, the selected search results may be grouped for communication to one or more receiving parties associated with one or more selection elements. The user selection may also be a voice command.

The server then sends content of the one or more search results to the designated receiving parties (step 512). The content may be or includes a hyperlink to the search result, the content of a webpage or search result, a summary of the search result or other snapshot, or any other content of the selected search result FIG. 6 is a pictorial representation of a graphical user interface displaying publication information for search results in accordance with an illustrative embodiment. The graphical user interfaces of FIGS. 6, 7, and 8 may represent visual or audio interfaces. For example, the interfaces may be part of an interactive voice response system that the user may access through a communications or computing device. Alternatively, the graphical user interface may be a browser search engine, webpage, application, touch screen, or other similar interface or device. FIGS. 6, 7, and 8 may include any number of selections, displays, or interface elements. For example, the selection elements may include drop down menus, text boxes, icons, hyperlinks, tabs, or other interface constructs.

In one embodiment, the graphical user interface 600 may include selection elements 602, 604, and 606, and search results 608. Selection element 602 may allow a user to enter text, numbers, or data that are utilized to perform a search of a communications network, such as an intranet, extranet, or the Internet. Selection element 604 may allow a user to prioritize the search results based on the content dates. For example, the search results may be prioritized or displayed based on the publication date, post date, updates, or averages, or other combinations of one or more of those dates.

Selection element 606 may provide the user advanced search options regarding the content dates of the content associated with the search results 608. In one embodiment, the user may limit or remove search results prior to or before a date or a specified range. The user may also affirmatively select applicable content dates, such as from the $2^{nd}$ day of January to the 25th day of January. The content dates may further include the exact time of day the search results and associated content were published, posted, or updated and where reported or registered.

The search results 608 may include one or more reference pages, sites, documents, files, or other information retrieved based on the text entered in selection element 602. The search results 608 may include a small summary of the relevant information including keywords selected by the user. The search results 608 may also list the applicable network or web address the content was retrieved from.

The search results 608 may display information including the publication date the original content was created, the post date, the date the created content was first posted to the applicable communications network, and a last updated clause indicating when the information was last updated. In some cases, the exact dates may be undeterminable and an assumption or a guess may be listed with qualifying language. As well as, the content dates, as described in the search result 608, may display any content history that may be automatically or manually selected for display.

FIG. 7 is a pictorial representation of a graphical user interface for collapsing search results in accordance with an illustrative embodiment. The graphical user interface 700 may include any number of selection elements or sections, including sections 702, 704, 706, and 708. Section 702 may allow a user to enter text, data, and information that may be utilized to perform a search.

Section 704 may include advanced options for limiting or collapsing the search performed based on the information of section 702. In one embodiment, the information in section 706 may specify additional limitations or information that is utilized to narrow the search. In particular, the information of section 704 may be auto populated based on user input in section 706. For example, if a user selects to remove a search result and the associated content, the intelligent logic of the search engine may propose one or more reasons, inferences, or logic statements why the user is removing the information. The user may automatically select or manually select those assertions at which time the information may be included in section 704 and then subsequently, in section 708. For example, if the user selects to remove a particular search result, the search engine through the graphical user interface 700 may display a pop-up or other interactive information that requests additional information clarifying why the search result was removed. For example, the user may select, based on additional prompting, to remove all search results related to a particular website. The user may also select to remove search results based on content type, classification, proximity, date, geographic area, language, or other information.

Section 706 may display the search results to the user. The user may be prompted to remove search results based on the website or related results. The prompts utilized in section 706 may be dynamic. As a result, if a user removes search results for a particular reason, factor or parameter section 706 may display those limitations to the user. The selection of section 706 may be utilized to establish user preferences and history so that ongoing searches performed by the user are more carefully tailored to the preferences and information previously disclosed by the user. Section 708 may display a summary of the excluded, limited, or collapsed search results. In one embodiment, sections 704 and 708 may be integrated to clarify the content removed. For example, section 708 may display a number of documents, files, or search results excluded and whether that information is excluded based on historical user preferences or active selections received by the user during the current search.

FIG. 8 is a pictorial representation of a browser for communicating search results in accordance with an illustrative embodiment. The browser 800 is another embodiment of a graphical user interface application program, search engine, or other interface that may be utilized to receive and display information to the user. The browser 800 may include any number of selection elements and sections including section 802, 804, 806, and 808. In one embodiment, section 802 may allow a user to specify a username and password. The username and password or other identifier may ensure that the current user is authorized to communicate information. Section 802 may also allow a user to save or communicate results to a specified location. As a result, the user may view or further analyze the search results at a later time when the user is so inclined.

Section 804 may allow a user to enter the search information. Section 806 may allow a user to specify communications, sending or transmission options, preferences, and parameters. In one embodiment, the user may choose or create a selection element, as well as an identifier for the selection element and communications information associated with the selection element. For example, the user may link a selection element with a home computer and corresponding e-mail address, as well as, a blog feed. The user may associate a phone number and instant messaging identifier with a selection element for a friend, such as "Jill's mobile". As a result, any time the user activates or selects the selection element, the search result or the content may be automatically sent utilizing text and chart messaging. The selection element may also include an icon for automatically saving the search results in a specified location for further review. As a result by simply selecting the selection element, the search result is saved to the specified location.

Section 806 may allow a user to specify the communicated information which may include the search result and corresponding network or web address, the content of the search result, or a summary of the content and search result or any combination thereof. Section 808 may display the search results, and/or selected portions of the content to the user. In particular, section 808 may display the selection elements to the user. By activating or selecting the selection elements, the search result may be automatically sent to the selected party, device, or site. In addition, the user may select one or more contacts or addressees from a network address, list, directory, or personal contact information. The browser 800 may allow a user to more effectively communicate important, relevant, useful, funny, or other information for personal, work, organizational, or other uses and purposes.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed as new and desired to be protected by Letters Patent of the United States is:

1. A method for communicating search results, the method comprising:
   receiving user input from a first user to perform a search of a communications network;
   performing the search based on the first user input to generate search results;
   determine whether the search results include content dates for content;
   determine a publication date of the content for each search result;
   determine a post data of the content for each search result;
   displaying the search results and a plurality of selection elements associated with each of the search results, wherein each of the plurality of selection elements is associated with one or more second users separate from the first user and is selectable by the first user to communicate each of the search results to the one or more second users separate from the first user;
   receiving a user selection of one or more of the plurality of selection elements associated with the one or more second users separate from the first user; and
   communicating the search results to the associated one or more second users separate from the first user, in response to the user selection.

2. The method according to claim 1, further comprising:
   associating each of the plurality of selection elements with the one or more second users separate from the first user.

3. The method according to claim 2, further comprising:
   specifying communications information for each of the one or more second users separate from the first user.

4. The method according to claim 2, further comprising:
   selecting an image for displaying each of the plurality of selection elements.

5. The method according to claim 3, wherein the communications information indicates one or more types of communication.

6. The method according to claim 3, wherein the communications information enables a communication of the search results to the one or more second users separate from the first user.

7. The method according to claim 1, further comprising:
formatting the search results for the one or more types of communication.

8. The method according to claim 1, further comprising:
grouping the search results selected for communication to the one or more second users separate from the first user.

9. The method according to claim 1, wherein the user selection is a voice command from the first user.

10. The method according to claim 1, further comprising:
displaying a contact list to the first user for selecting one or more second users separate from the first user not associated with one of the plurality of selection elements.

11. A server for communicating search results, the server comprising:
a browser operable to receive user input from a first user for a search of the Internet, the browser performs the search to return search results, the browser determines whether the search results include content dates for content, determines a publication date of the content for each search result, and determines a post date of the content for each search result, the search results are displayed to the first user together with a plurality of selection elements associated with each of the search results for communicating each of the search results to one or more second users separate from the first user; and
user preferences in communication with the browser, the user preferences are operable to receive user selections associating each of the plurality of selection elements with the one or more second users separate from the first user and to store communications information for each of the one or more second users separate from the first user,
the browser is operable to communicate the search results to the one or more second users separate from the first user, in response to a user selection of one or more of the plurality of selection elements.

12. The server according to claim 11, further comprising:
a search engine in communication with the browser, the search engine operable to execute the search to generate the search results communicated to the browser.

13. The server according to claim 11, wherein the user preferences store an image selected by the first user as each of the plurality of selection elements, and wherein the communications information specifies a type of communication and information for performing the communications.

14. The server according to claim 11, wherein the user preferences specify whether to communicate a hyperlink for each of the search results, the hyperlink and content associated with the hyperlink, or only the content associated with the hyperlink.

15. The server according to claim 14, wherein the communication of the selected search results are performed utilizing the user preferences based on a single selection of the one or more of the plurality of selection elements.

16. A server for communicating search results, the server comprising:
a processor for executing a set of instructions; and
a memory in communication with the processor for storing the set of instructions, wherein the set of instructions are executed by the processor to:
receive user input from a first user to perform a search of a communications network;
perform the search based on the user input to generate the search results;
determine whether the search results include content dates for content;
determine a publication date of the content for each search result;
determine a post data of the content for each search result;
display the search results and a plurality of selection elements associated with each of the search results, wherein each of the plurality of selection elements is associated with one or more second users separate from the first user and is selectable by the first user to communicate each of the search results to the one or more second users separate from the first user;
receive a user selection of one or more of the plurality of selection elements associated with the one or more second users separate from the first user; and
communicate one or more of the search results to the associated one or more second users separate from the first user, in response to the user selection.

17. The server according to claim 16, further comprising:
wherein the communications network is a private network, wherein the one or more second users separate from the first user are authorized to receive the search results from the private network.

18. The server according to claim 16, wherein the set of instructions are further executed to:
assign a graphic selected by the first user as each of the plurality of selection elements; and
associate each of the plurality of selection elements with the one or more second users separate from the first user.

19. The server according to claim 16, wherein the search results are communicated based on a single selection by the first user of a selection element.

20. The server according to claim 16, wherein the search results are communicated based on user preferences, wherein the user preferences specify whether to communicate a hyperlink for each of the search results, the hyperlink and content associated with the hyperlink, or only the content associated with the hyperlink.

* * * * *